United States Patent
Pai et al.

(10) Patent No.: US 12,044,930 B1
(45) Date of Patent: Jul. 23, 2024

(54) TOUCH-TYPE ELECTRONIC PAPER DEVICE WITH A FRONT LIGHTING STRUCTURE

(71) Applicants: Chih-Chiang Pai, Taoyuan (TW); Meng-Kuei Lin, Taoyuan (TW); Jung-Han Liu, Taoyuan (TW)

(72) Inventors: Chih-Chiang Pai, Taoyuan (TW); Meng-Kuei Lin, Taoyuan (TW); Jung-Han Liu, Taoyuan (TW)

(73) Assignee: Young Fast Optoelectronics Co., Ltd., Taoyuan (TW)

( * ) Notice: Subject to any disclaimer, the term of this patent is extended or adjusted under 35 U.S.C. 154(b) by 0 days.

(21) Appl. No.: 18/200,651

(22) Filed: May 23, 2023

Related U.S. Application Data

(63) Continuation-in-part of application No. 18/094,140, filed on Jan. 6, 2023.

(51) Int. Cl.
| | | |
|---|---|---|
| *G02F 1/1333* | (2006.01) | |
| *G02F 1/1335* | (2006.01) | |
| *G02F 1/1677* | (2019.01) | |
| *G06F 3/041* | (2006.01) | |
| *G02F 1/137* | (2006.01) | |

(52) U.S. Cl.
CPC .. *G02F 1/133616* (2021.01); *G02F 1/133334* (2021.01); *G02F 1/13338* (2013.01); *G02F 1/1677* (2019.01); *G06F 3/041* (2013.01); *G02F 1/13718* (2013.01); *G02F 2201/08* (2013.01)

(58) Field of Classification Search
CPC ........... G02F 1/133334; G02F 1/13338; G02F 1/133616; G02F 1/1677; G06F 3/041
See application file for complete search history.

(56) References Cited

U.S. PATENT DOCUMENTS

| | | | |
|---|---|---|---|
| 2020/0387042 A1* | 12/2020 | Hsieh | G02F 1/16753 |
| 2023/0259234 A1* | 8/2023 | Lin | G06F 3/0443 345/174 |

* cited by examiner

*Primary Examiner* — Paisley L Wilson

(57) ABSTRACT

An electronic paper device includes a touch cover plate module, a front lighting module and an electronic paper display module. The touch cover plate module has a top plate, a touch sensor and a bottom plate. The top plate is disposed with a black bezel. The bottom plate is disposed with a transparent conductive film with a low refractive index. The front lighting module has a light guide plate. An outer edge portion of the light guide plate is disposed with a point light source. The point light source emits light from a side of the light guide plate to convert the emitted light into a surface light source. An upper surface of the light guide plate is attached on the transparent conductive film to form a total reflection interface on the light guide plate and an electromagnetic mask layer between the touch sensor and the electronic paper display module.

9 Claims, 2 Drawing Sheets

TOUCH-TYPE ELECTRONIC PAPER DEVICE WITH A FRONT LIGHTING STRUCTURE

CROSS-REFERENCE TO RELATED APPLICATIONS

This application is a continuation-in-part of U.S. patent application Ser. No. 18/094,140 filed Jan. 16, 2023.

BACKGROUND

Technical Field

The invention relates to electronic paper devices, particularly to a touch-type electronic paper device with a front lighting structure.

Related Art

Electronic papers have been widely applied to various electronic devices. An electronic paper display has properties of simulating paper, such as flexibility, wide viewable angle, light weight, high definition, high contrast and indoor and outdoor readability, and has an advantage of low power consumption. An electronic paper display itself is not illuminant and usually needs environment light to a light source to the display. However, in low-light circumstances such as an indoor space, the displaying quality will be seriously affected. As a result, a current electronic paper display is usually provided with a front lighting module to provide auxiliary illumination to guarantee the displaying quality. The front lighting module is installed on the front of an electronic paper display to provide auxiliary illumination to the electronic paper display.

A traditional front lighting module is disposed with one or more point light source on a lateral side of a light guide plate. The light guide plate can convert a point light source into a surface light source to make light evenly emit to a display of an electronic paper display module for illumination. The front lighting module is disposed between a surface cover plate and a lamination of an electronic paper display module and each lamina is adhered by an optical adhesive into one piece. A peripheral area of a bottom surface of the surface cover plate is disposed with an opaque black bezel as a decorative bezel for cloaking a marginal circuit structure. The point light source of the front lighting module is located just under the black bezel. However, in practice, the light beams of the front lighting module usually cause an uneven ghosting phenomenon at the display near the black bezel to affect the viewability of the electronic paper display. According to the researches, refractive indexes of the surface cover plate, the optical adhesive for adhesion and the material the light guide plate are similar, the total reflection effect of the surface of the light guide plate will be damaged after they have been adhered. As a result, part of the light emitted by the point light source from a lateral side of the light guide plate will be refracted to the optical adhesive and the surface cover plate. The refracted light is affected by the black bezel so that a ghosting phenomenon with an uneven shadow texture at the display near the black bezel will appear to seriously affect and reduce the viewability of the electronic paper display.

In addition, many applications provide a touch sensor in front of an electronic paper display as an input device to allow users to make interactive operations with the images of the electronic paper display through the touch sensor. This further expands convenience of the electronic paper. However, as known, a touch sensor is easy to suffer from electromagnetic interference (EMI) and radio frequency interference (RFI). Thus, when an electronic paper display is changing its image, such as turning page or clearing image, the electronic paper will generate an interference signal to usually cause a false positive point phenomenon of the touch sensor to form a using trouble.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

An object of the invention is to provide an improved touch-type electronic paper device with a front lighting structure, which disposes a transparent conductive film with a low refractive index on a light guide plate of the front lighting module to form a total reflection interface on an upper surface of the light guide plate so as to remove the drawback of the ghosting phenomenon appearing near the black bezel portion and increase the illumination to the electronic paper display.

Another object of the invention is to provide an improved touch-type electronic paper device with a front lighting structure, whose transparent conductive film with a low refractive index forms an electromagnetic mask layer between the touch sensor and the electronic paper display to isolate the EMI signals and prevent the touch sensor from being affected to malfunction.

To accomplish the above object, the invention provides a touch-type electronic paper device with a front lighting structure, which includes a touch cover plate module, a front lighting module and an electronic paper display module. The touch cover plate module is composed of a top plate, a touch sensor and a bottom plate which are superposed into one piece. A peripheral area of a bottom surface of the top plate is disposed with a black bezel. A bottom surface of the bottom plate is disposed with a transparent conductive film with a low refractive index. The front lighting module has a light guide plate. At least one outer edge portion of the light guide plate is disposed with at least one point light source. The point light source emits light from a lateral side of the light guide plate to make the emitted light converted into a surface light source toward a bottom side of the light guide plate. A refractive index of the transparent conductive film is less than that of the light guide plate. The touch cover plate module, the front lighting module and the electronic paper display module are superposed into one piece in order. An upper surface of the light guide plate is attached on a bottom side of the transparent conductive film to form a total reflection interface on the upper surface of the light guide plate and an electromagnetic mask layer between the touch sensor and the electronic paper display module.

According to the invention, the refractive index of the transparent conductive film is below 1.0. Preferably, the refractive index of the transparent conductive film is below 0.7.

According to the invention, the transparent conductive film is a metallic film with a thickness below 70 nm. In an embodiment, the transparent conductive film is a metal film containing molybdenum.

According to the invention, the black bezel is an opaque or a low-transmittance film made of a non-conductive material.

The invention further includes a hooding frame disposed at a peripheral area of the bottom surface of the bottom plate. The hooding frame is a film layer made of an opaque or a low-transmittance material. A width of the hooding frame is less than or equal to a width of the black bezel.

According to the invention, the touch sensor is a capacitive touch sensor, a resistive touch sensor, an electromagnetic touch sensor, a sonic touch sensor, an oscillating wave touch sensor, an optical touch sensor or a combination of two or more of them.

DETAILED DESCRIPTION

Figure 1:
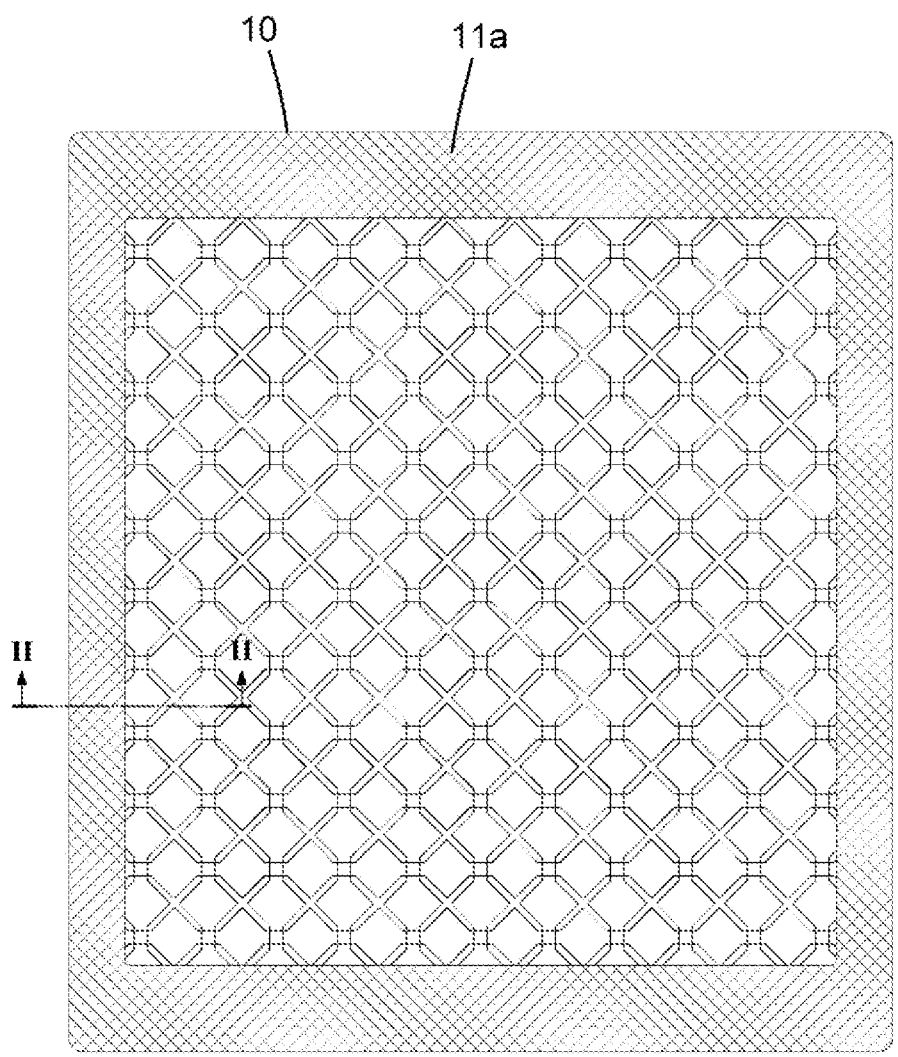
FIG. 1 is a schematic plan view of the invention.
Figure 2:
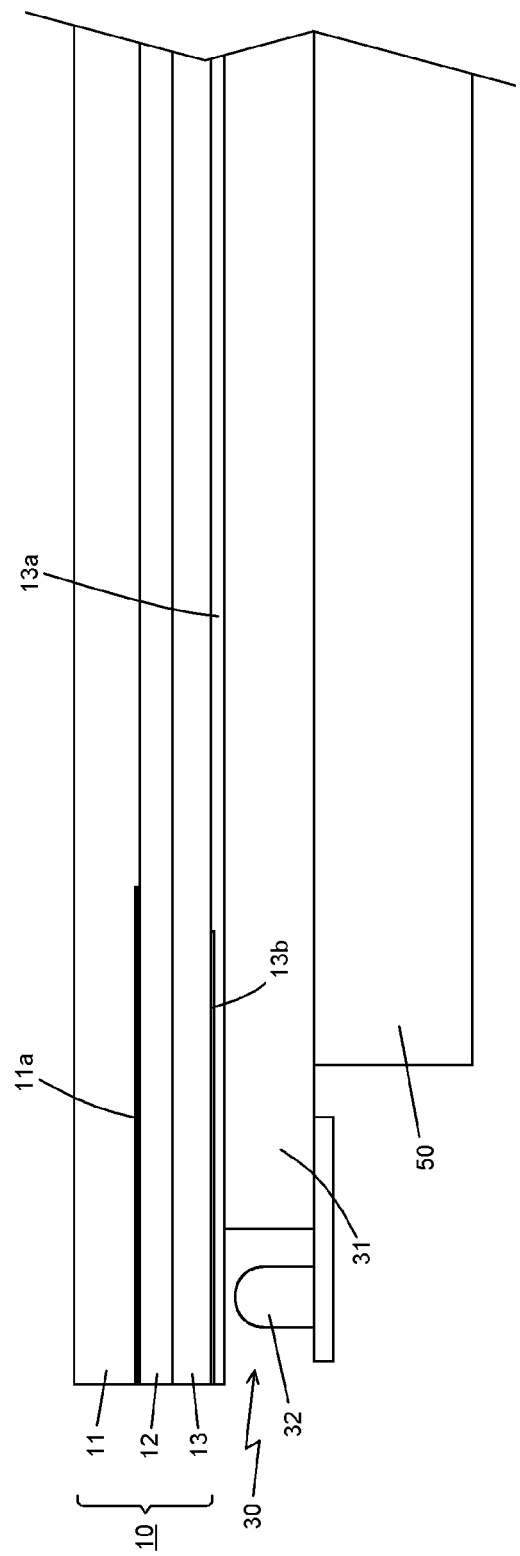
FIG. 2 is a cross-sectional view of the lamination along line II-II in FIG. 1.

FIGS. 1 and 2 depict a preferred embodiment of the touch-type electronic paper device with a front lighting structure of the invention, whose lamination includes a touch cover plate module 10, a front lighting module 30 and an electronic paper display module 50 in order.

The touch cover plate module 10 is composed of a top plate 11, a touch sensor 12 and a bottom plate 13. The top plate 11 is a thin plate with high transmittance and great mechanic strength and is made of, but not limited to, various glass, polymethylmethacrylate (PMMA), polyethylene terephthalate (PET), polycarbonate (PC) or cycloolefin copolymer (COC/COP). An upper surface of the top plate 11 may be a hardened surface and/or an optical function surface, such as an anti-glare surface (AG) or anti-reflective surface (AR). A peripheral area of a bottom surface of the top plate 11 is disposed with a black bezel 11a. The black bezel 11a is an opaque or a low-transmittance film made of a non-conductive material. The non-conductive material may adopt, but not limited to, ink or photoresist. The non-conductive material may use printing, sputtering or coating to form a film with a thickness greater than 15 μm on the peripheral area of the bottom surface of the top plate 11.

The touch sensor 12 shown in FIG. 1 is a capacitive touch sensor and is composed of an x-axis sensing layer and a y-axis sensing layer. These two sensing layers are insulatively arranged and are separately grounded and connected to a control circuit (not shown). Usually, a touch active area of the touch sensor 12 has a local range corresponding to the visible area of the electronic paper display module 50 to be able to be in association with an image shown by the electronic paper display module 50 to serve as a touch input device so as to allow users to make interactive operations with images provided by the electronic paper display module 50 through the touch sensor 12 to form a friendly human-machine interactive user interface. Besides the capacitive touch sensor, the touch sensor 12 may adopt, but not limited to, a resistive touch sensor, an electromagnetic touch sensor, a sonic touch sensor, an oscillating wave touch sensor, an optical touch sensor or a combination of two or more of the above touch sensors.

The bottom plate 13 is a thin plate with high transmittance and is made of, but not limited to, various glass, polymethylmethacrylate (PMMA), polyethylene terephthalate (PET), polycarbonate (PC) or cycloolefin copolymer (COC/COP). A bottom surface of the bottom plate 13 is disposed with a transparent conductive film 13a with a low refractive index. The refractive index of the transparent conductive film 13a must be less than that of the light guide plate 31. Preferably, the refractive index of the transparent conductive film 13a is below 1.0. More preferably, the refractive index of the transparent conductive film 13a is below 0.7. In an embodiment, the transparent conductive film 13a is a metallic film made of a metal material with great conductivity coated on the bottom surface of the bottom plate 13 by evaporation or sputtering to form a metal film with a thickness approximately between 20 nm and 70 nm. For example, it may be a metal film made of a material containing molybdenum, whose refractive index is about 0.696. In addition, a peripheral area of the bottom surface of the bottom plate 13 is disposed with a hooding frame 13b for preventing the vertical light from the lower point light source 32 and the light guide plate 31 from directly entering the bottom plate 13 to cause the interfering ghosting phenomenon near the black bezel 11a. The hooding frame 13b is a film layer made of an opaque or a low-transmittance material such as ink or photoresist by printing, sputtering or coating. A width of the hooding frame 13b on the periphery of the bottom surface of the bottom plate 13 is less than or equal to a width of the black bezel 11a.

The front lighting module 30 has a light guide plate 31. At least one outer edge portion of the light guide plate 30 is disposed with at least one point light source 32. The point light source 32 is an LED or a micro LED. The point light source 32 emits light from a lateral side of the light guide plate 31 to make the emitted light converted into a surface light source toward a bottom side of the light guide plate 31. The area size of the light guide plate 31 approximately corresponds to the visible area of the electronic paper display module 50 to provide illumination to the visible area. The light guide plate 31 is made of, but not limited to, polymethylmethacrylate (PMMA), polyethylene terephthalate (PET) or polycarbonate (PC). The refractive index of the material of the light guide plate 31 is approximately between 1.47 and 1.51. In addition, to make the light guide plate 31 form a surface light source with even brightness distribution, multiple diffusion points (not shown) on the light guide plate 31 for converting the incident light from the point light source 32 into light evenly distributed in the plate. The diffusion points may adopt a material with a refractive index higher than the light guide plate 31 or use both cavities indented on or bumpers projecting from the light guide plate 31 and the uneven distribution of the diffusion points on the light guide plate 31 to accomplish the effect of even brightness distribution on the light guide plate 31.

The electronic paper display module 50 is a reflective display which has lower power consumption and flexibility and utilizes the electrophoretic technology or the cholesteric liquid crystal technology to present the image signal onto the display surface of the electronic paper display module 50 as an image.

As shown in FIG. 2, the touch cover plate module 10, the front lighting module 30 and the electronic paper display module 50 are superposed into one piece in order to make the upper surface of the light guide plate 31 is attached on the bottom surface of the transparent conductive film 13a. Because the refractive index of the transparent conductive film 13a (such as molybdenum film with a refractive index of 0.696) is much lower than that of the light guide plate 31 (a typical refractive index is between 1.47 and 1.51), a total reflection interface can be formed on the upper surface of the light guide plate 31. Thus, the light entering the light guide plate 31 from a lateral side thereof will not be upward refracted to be disadvantageously affected by the black bezel 11a and the problem of the ghosting phenomenon at the display near the black bezel 11a can be improved. The light in the light guide plate 31 can be concentrated and projected to the visible area of the electronic paper display module 50 to provide great illumination. The transparent conductive film 13a may form an electromagnetic mask layer between the touch sensor 12 and the electronic paper display module 50 to isolate the EMI and RFI and prevent the touch sensor 12 from malfunctioning. In addition, the black bezel 11a of the touch cover plate module 10 can cloak both the point light source 32 located at the edge of the front lighting module 30 and the peripheral circuit area of the electronic paper display module 50 to improve the appearance of the device.

While this disclosure has been described by means of specific embodiments, numerous modifications and variations could be made thereto by those skilled in the art without departing from the scope and spirit of this disclosure set forth in the claims.

What is claimed is:

1. A touch-type electronic paper device with a front lighting structure, comprising:
   a touch cover plate module, composed of a top plate, a touch sensor and a bottom plate which are superposed into one piece, a peripheral area of a bottom surface of the top plate being disposed with a black bezel, and a bottom surface of the bottom plate being disposed with a transparent conductive film;
   a front lighting module, having a light guide plate, at least one outer edge portion of the light guide plate being disposed with at least one point light source, and the point light source emitting light from a lateral side of the light guide plate to make the emitted light converted into a surface light source toward a bottom side of the light guide plate; and
   an electronic paper display module;
   wherein a refractive index of the transparent conductive film is less than that of the light guide plate, the touch cover plate module, the front lighting module and the electronic paper display module are superposed into one piece in order, an upper surface of the light guide plate is attached on a bottom side of the transparent conductive film to form a total reflection interface on the upper surface of the light guide plate and an electromagnetic mask layer between the touch sensor and the electronic paper display module.

2. The touch-type electronic paper device of claim 1, wherein the refractive index of the transparent conductive film is below 1.0.

3. The touch-type electronic paper device of claim 2, wherein the refractive index of the transparent conductive film is below 0.7.

4. The touch-type electronic paper device of claim 3, wherein the transparent conductive film is a metallic film with a thickness below 70 nm.

5. The touch-type electronic paper device of claim 4, wherein the transparent conductive film is a metal film containing molybdenum.

6. The touch-type electronic paper device of claim 1, wherein the black bezel is an opaque or a low-transmittance film made of a non-conductive material.

7. The touch-type electronic paper device of claim 1, further comprising a hooding frame disposed at a peripheral area of the bottom surface of the bottom plate, and the hooding frame being a film layer made of an opaque or a low-transmittance material.

8. The touch-type electronic paper device of claim 7, wherein a width of the hooding frame is less than or equal to a width of the black bezel.

9. The touch-type electronic paper device of claim 1, wherein the touch sensor is a capacitive touch sensor, a resistive touch sensor, an electromagnetic touch sensor, a sonic touch sensor, an oscillating wave touch sensor, an optical touch sensor or a combination of two or more of them.

\* \* \* \* \*